US010448351B2

United States Patent
Yoo et al.

(10) Patent No.: US 10,448,351 B2
(45) Date of Patent: Oct. 15, 2019

(54) EMPLOYING NEIGHBORING CELL ASSISTANCE INFORMATION FOR INTERFERENCE MITIGATION

(71) Applicant: QUALCOMM Incorporated, San Diego, CA (US)

(72) Inventors: Taesang Yoo, San Diego, CA (US); Tao Luo, San Diego, CA (US); Wanshi Chen, San Diego, CA (US); Hao Xu, San Diego, CA (US); Yongbin Wei, San Diego, CA (US); Peter Gaal, San Diego, CA (US); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/227,279

(22) Filed: Mar. 27, 2014

(65) Prior Publication Data

US 2014/0293971 A1    Oct. 2, 2014

Related U.S. Application Data

(60) Provisional application No. 61/809,226, filed on Apr. 5, 2013, provisional application No. 61/807,712, filed on Apr. 2, 2013.

(51) Int. Cl.
*H04W 56/00* (2009.01)
*H04W 72/12* (2009.01)
*H04W 72/04* (2009.01)

(52) U.S. Cl.
CPC ....... *H04W 56/003* (2013.01); *H04W 72/042* (2013.01); *H04W 72/1226* (2013.01)

(58) Field of Classification Search
None
See application file for complete search history.

(56) References Cited

U.S. PATENT DOCUMENTS

| 8,868,091 B2 | 10/2014 | Damnjanovic et al. |
| 9,313,744 B2 | 4/2016 | Damnjanovic et al. |
| (Continued) | | |

FOREIGN PATENT DOCUMENTS

| CN | 101018220 A | 8/2007 |
| CN | 101605382 A | 12/2009 |
| (Continued) | | |

OTHER PUBLICATIONS

International Search Report and Written Opinion—PCT/US2014/032228—ISA/EPO—dated Jul. 29, 2014.

*Primary Examiner* — Mohammad S Adhami
*Assistant Examiner* — Vladislav Y Agureyev
(74) *Attorney, Agent, or Firm* — Patterson & Sheridan, L.L.P.

(57) ABSTRACT

Certain aspects of the present disclosure relate to methods and apparatus for employing a neighboring cell's assistance information for interference mitigation (e.g., by conveying the information to a user equipment). A base station (BS) may determine assistance information for a neighboring cell and convey it to a user equipment (UE). A UE may receive assistance information for a neighboring cell and use that information for performing interference cancellation or suppression on received signals. The UE may receive the assistance information from a serving cell or a non-serving cell. The assistance information may be valid for a particular transmission instance, for a known period of time, or until updated by a BS.

24 Claims, 11 Drawing Sheets

(56) References Cited

U.S. PATENT DOCUMENTS

| | | | |
|---|---|---|---|
| 2007/0207828 A1* | 9/2007 | Cheng et al. | 455/522 |
| 2008/0108363 A1 | 5/2008 | Yu et al. | |
| 2008/0267318 A1* | 10/2008 | Ihm | H04B 7/0671 |
| | | | 375/299 |
| 2010/0255852 A1 | 10/2010 | Chen et al. | |
| 2010/0309861 A1 | 12/2010 | Gorokhov et al. | |
| 2010/0323712 A1* | 12/2010 | Guey et al. | 455/452.2 |
| 2011/0075624 A1* | 3/2011 | Papasakellariou | H04L 5/0053 |
| | | | 370/329 |
| 2011/0170424 A1* | 7/2011 | Safavi | 370/242 |
| 2011/0255468 A1* | 10/2011 | Vajapeyam | H04W 72/082 |
| | | | 370/328 |
| 2012/0082140 A1* | 4/2012 | Lin et al. | 370/336 |
| 2012/0099503 A1* | 4/2012 | Guo et al. | 370/312 |
| 2012/0156984 A1* | 6/2012 | Gan | H04B 7/15542 |
| | | | 455/7 |
| 2012/0281636 A1* | 11/2012 | Xiao | H04B 7/024 |
| | | | 370/329 |
| 2012/0314567 A1 | 12/2012 | Seo et al. | |
| 2013/0003569 A1* | 1/2013 | Lindoff | H04L 1/0045 |
| | | | 370/252 |
| 2013/0070692 A1* | 3/2013 | Miki | H04W 72/048 |
| | | | 370/329 |
| 2013/0077578 A1 | 3/2013 | Wang et al. | |
| 2013/0114525 A1* | 5/2013 | Ahmadi | H04L 5/0053 |
| | | | 370/329 |
| 2013/0163536 A1* | 6/2013 | Anderson | H04W 72/1284 |
| | | | 370/329 |
| 2013/0178220 A1* | 7/2013 | Lee | H04L 5/0007 |
| | | | 455/450 |
| 2013/0223267 A1* | 8/2013 | Jung | H04J 11/005 |
| | | | 370/252 |
| 2013/0250882 A1* | 9/2013 | Dinan | H04W 72/0426 |
| | | | 370/329 |
| 2013/0301451 A1* | 11/2013 | Siomina | H04W 24/00 |
| | | | 370/252 |
| 2013/0315157 A1* | 11/2013 | Krishnamurthy | H04L 5/0053 |
| | | | 370/329 |
| 2013/0315191 A1* | 11/2013 | Yoshimoto | H04J 11/0056 |
| | | | 370/329 |
| 2014/0106802 A1* | 4/2014 | Cheng et al. | 455/509 |
| 2014/0112280 A1* | 4/2014 | Lee et al. | 370/329 |
| 2014/0192740 A1* | 7/2014 | Ekpenyong | H04L 5/0094 |
| | | | 370/329 |
| 2014/0233407 A1* | 8/2014 | Pourahmadi | H04L 5/0007 |
| | | | 370/252 |
| 2014/0286219 A1 | 9/2014 | Siomina et al. | |
| 2014/0307696 A1* | 10/2014 | Choi et al. | 370/329 |
| 2014/0307729 A1* | 10/2014 | Son | H04J 11/0056 |
| | | | 370/350 |
| 2014/0370908 A1* | 12/2014 | Lee | H04L 5/0032 |
| | | | 455/452.1 |
| 2015/0016376 A1* | 1/2015 | Seo | H04W 72/0406 |
| | | | 370/329 |
| 2015/0078257 A1* | 3/2015 | Wu | H04L 25/0224 |
| | | | 370/328 |
| 2015/0124691 A1* | 5/2015 | Li | H04L 5/005 |
| | | | 370/312 |
| 2015/0139004 A1* | 5/2015 | Fodor | H04W 72/082 |
| | | | 370/252 |
| 2015/0195820 A1* | 7/2015 | Jung | H04W 72/042 |
| | | | 370/329 |
| 2015/0358105 A1* | 12/2015 | Jung | H04J 11/0056 |
| | | | 370/329 |
| 2015/0372779 A1* | 12/2015 | Lim | H04J 11/005 |
| | | | 370/338 |
| 2015/0373569 A1* | 12/2015 | Hwang | H04J 11/0023 |
| | | | 370/235 |
| 2016/0021565 A1* | 1/2016 | Kim | H04L 5/005 |
| | | | 370/329 |
| 2016/0080963 A1* | 3/2016 | Marinier | H04L 5/0053 |
| | | | 370/252 |

FOREIGN PATENT DOCUMENTS

| | | | | |
|---|---|---|---|---|
| EP | 2675212 B1 * | 8/2018 | | H04J 11/0056 |
| WO | WO-2011088465 A1 | 7/2011 | | |
| WO | WO-2011119750 A1 | 9/2011 | | |
| WO | WO-2011125929 A1 | 10/2011 | | |
| WO | WO-2012018894 A1 | 2/2012 | | |
| WO | WO-2012061973 A1 | 5/2012 | | |
| WO | WO-2013007491 A1 | 1/2013 | | |
| WO | WO-2013063548 A2 | 5/2013 | | |
| WO | WO-2013119052 A1 * | 8/2013 | | H04W 72/0406 |
| WO | WO-2014133358 A1 | 9/2014 | | |

* cited by examiner

| Index | Scheduling information (for illustration purpose) | | |
|---|---|---|---|
| | RB allocation | Spatial scheme | MCS |
| 0 | none | - | - |
| 1 | all | SFBC for all RBs | QPSK for all RBs |
| 2 | {0,3,5,6,...} | SFBC for RBs a,b,c<br>LCDD for RBs x,y,z | QPSK for a,b,c<br>16QAM for RBs x,y,z |
| ... | ... | ... | ... |

FIG. 11

EMPLOYING NEIGHBORING CELL ASSISTANCE INFORMATION FOR INTERFERENCE MITIGATION

CROSS-REFERENCE TO RELATED APPLICATIONS

The present application for patent claims priority to U.S. Provisional Application No. 61/807,712, filed Apr. 2, 2013, and U.S. Provisional Application No. 61/809,226, filed Apr. 5, 2013, which are assigned to the assignee of the present application and hereby expressly incorporated by reference herein in their entirety.

FIELD

The present disclosure relates generally to communication systems, and more particularly, to methods and apparatus for employing a neighboring cell's assistance information for interference mitigation (e.g., by conveying the assistance information to a user equipment).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

A wireless communication network may include a number of base stations that can support communication for a number of mobile devices. In some technologies, mobile devices may be called access terminals, user equipments (UEs), mobile stations, and the like. A mobile device may communicate with a base station via downlink (DL) and uplink (UL) transmissions. The downlink (or forward link) refers to the communication link from the base station to the mobile device, and the uplink (or reverse link) refers to the communication link from the mobile device to the base station. Each base station has a coverage range, which may be referred to as the coverage area of the cell.

In cellular deployments, a macrocell is used to describe a cell serving a wide region such as rural, suburban, and urban areas. Smaller cells may be deployed in homes, small businesses, buildings, or other limited regions. These small cells fall into different classes such as picocells or femtocells. Picocells may be connected to a service provider's network or a macrocell via a direct backhaul. Femtocells are often connected to a service provider's network via broadband connections or other mediums. In 3GPP terms, these cells may be referred to as Home NodeBs (HNB) for UMTS (WCDMA, or High Speed Packet Access (HSPA)) and Home eNodeBs (HeNB) for LTE/LTE-A networks. Some small cells provide restricted access by UEs having an association with the cell. These restricted access cells may be called closed subscriber group (CSG) cells. Cells (e.g., macrocells, picocells, femtocells, etc.) that provide access to UEs associated with one or more provider networks without a specific association between the UE and the cell may be called open access cells.

While small cells typically transmit at lower power than macrocells, signals from a small cell may be received at a UE with relatively high signal strength compared to signals received from a macrocell. For example, where a UE is located near a cell edge for a macrocell but relatively close to a small cell, the small cell signals received at the UE may be as strong as or even stronger than the signals received from the macrocell. In instances where the small is a CSG cell and the UE is not a member of the CSG cell, the UE will not be able to access the network using the CSG cell and may have difficulty finding and decoding the appropriate signals from the macrocell for establishing a communication link with the macrocell, due to interference from the CSG cell signals.

SUMMARY

Certain aspects of the present disclosure provide a method for wireless communications by a base station (BS). The method generally includes determining assistance information for one or more cells that interfere or potentially interfere with at least a first user equipment (UE) served in a serving cell, and signaling the assistance information to the UE.

Certain aspects of the present disclosure provide a method for wireless communications by a user equipment (UE). The method generally includes receiving signaling of assistance information for one or more that interfere or potentially interfere with at least a first user equipment (UE) served in a serving cell, and using the information to mitigate interference by transmissions from at least one of the serving cell or one or more neighboring cells.

BRIEF DESCRIPTION OF THE DRAWINGS

FIG. 11 illustrates sets of scheduling information, in accordance with certain aspects of the present disclosure.

DETAILED DESCRIPTION

Figure 1:
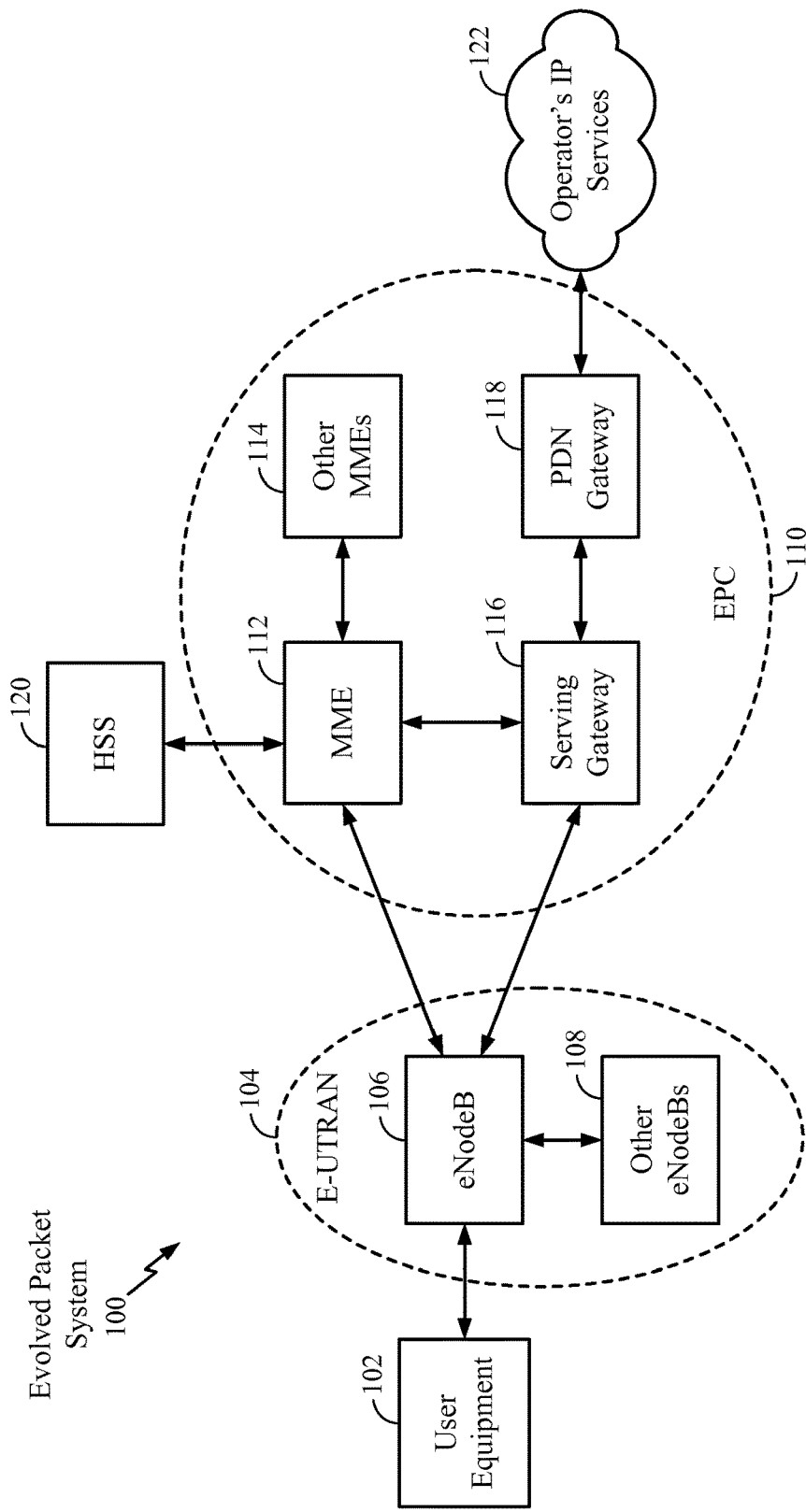
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various aspects of the disclosure provide for network assisted acquisition of neighbor cell transmissions for heterogeneous networks deploying macrocells and small cells (e.g., pico and femtocells). To provide network assisted acquisition for neighbor cell signals, small cells may transmit assistance information used by UEs in acquiring synchronization signals, system information, and/or paging information in transmissions from neighbor cells. The small cell may, for example, indicate whether the neighbor cell is synchronized with the small cell, signal whether the neighbor cell is system frame number (SFN) aligned, indicate a radio frame boundary offset of the neighbor cell, indicate neighbor cell system information block (SIB) information, indicate neighbor cell paging information, and/or indicate a subframe for performing interference cancellation to acquire various neighbor cell signals.

In some embodiments, small cells may transmit interference cancellation information used by UEs in suppressing or cancelling the small cell signals to detect and/or decode the neighbor cell signals. The small cell may, for example, transmit information that indicates transmission power level of the small cell signals (e.g., TPR, etc.), information that indicates how small cell signals are encoded or scrambled (e.g., small cell virtual ID, etc.), or information relating to how small cell transmissions are allocated (e.g., starting data channel symbol position, etc.). In some embodiments, small cells may operate according to a fixed set of parameters that can be used by UEs to suppress or cancel small cell signals. For example, small cells may operate according to a fixed set of TPR values, a fixed set of virtual IDs, fixed starting data channel symbol position, etc. In some embodiments, the virtual cell ID for small cells may follow a predetermined relationship with the physical cell ID of the small cell. The assistance information and/or interference cancellation information may be transmitted in system information messages that can be received by UEs prior to RRC connection (e.g., without registering or camping on the small cell).

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. Exemplary other access networks may include an IP Multimedia Subsystem (IMS) Packet Data Network (PDN), Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS Streaming Service (PSS). In this manner, the UE 102 may be coupled to the PDN through the LTE network.

Figure 2:
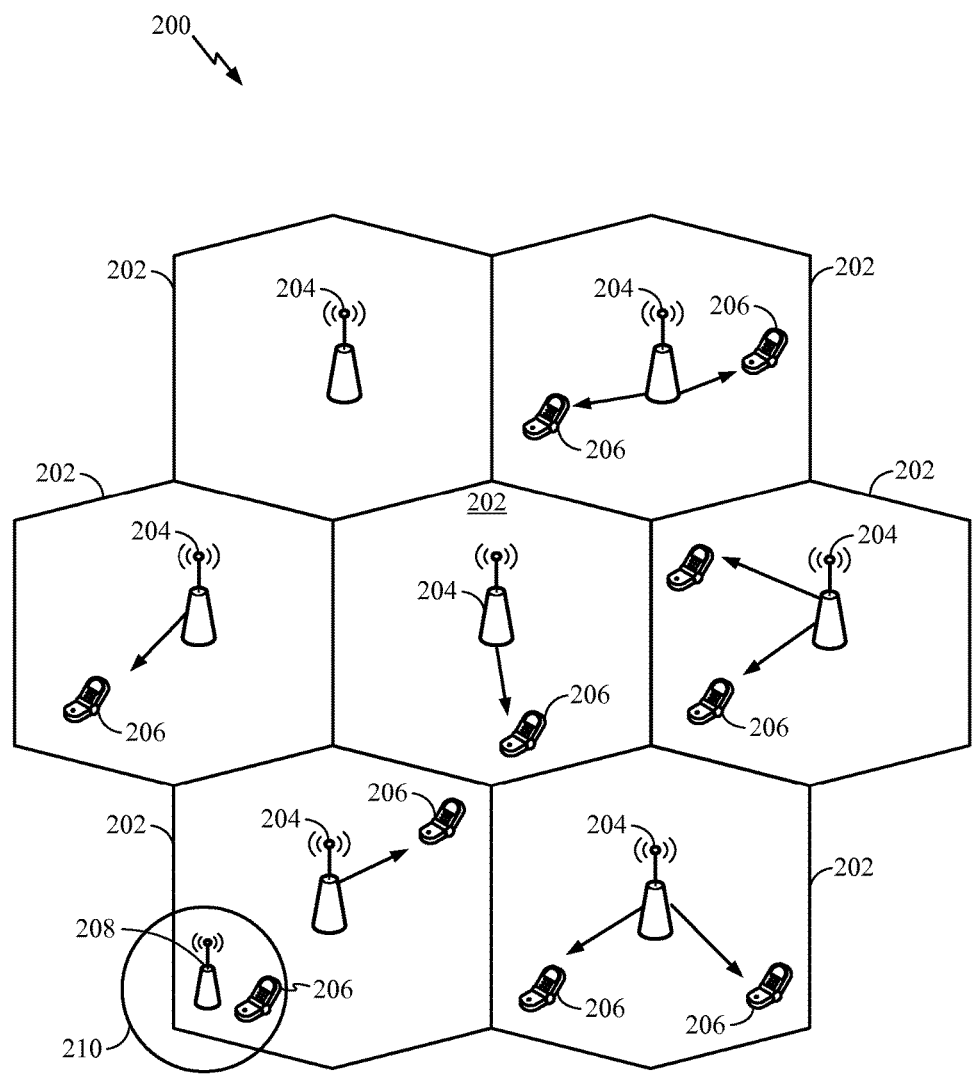
FIG. 2 is a diagram illustrating an example of an access network.

FIG. 2 is a diagram illustrating an example of an access network 200 in an LTE network architecture. In this example, the access network 200 is divided into a number of cellular regions (e.g., cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 and 208 may communicate with each other via backhaul links, which may be wired (e.g., copper, fiber, etc.) backhaul links and/or wireless (e.g., microwave, etc.) backhaul links. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to reduce the peak-to-average power ratio (PAPR) for transmitting from UEs, allowing the UEs to consume less power, compared to OFDMA.

Strategic deployment of small cells (e.g., picocells and femtocells) may be used to mitigate mobile device power consumption, as UEs typically operate using an internal power supply, such as a small battery, to facilitate highly mobile operation. For example, femtocells may be utilized to provide service within areas which might not otherwise experience adequate or even any service (e.g., due to capacity limitations, bandwidth limitations, signal fading, signal shadowing, etc.), thereby allowing UEs to reduce searching times, to reduce transmit power, to reduce transmit times, etc. Thus, where a UE is served by a picocell or femtocell, it is typically located relatively close the serving cell, often allowing the UE to communicate with reduced transmission power. In addition to unrestricted access or open access cells such as eNBs, the network may include CSG cells that provide restricted access to UEs having an association with the cell.

CSG cell will be used hereinafter generically to describe any access point (e.g., macrocell, picocell, femtocell, etc.) that provides restricted access to UEs having an association with the cell, and should not be interpreted as limiting. Each CSG cell may provide access for a set of UEs, and UEs allowed to access the CSG cell may maintain a "whitelist" for CSG cells on which they are allowed access.

Figure 3:
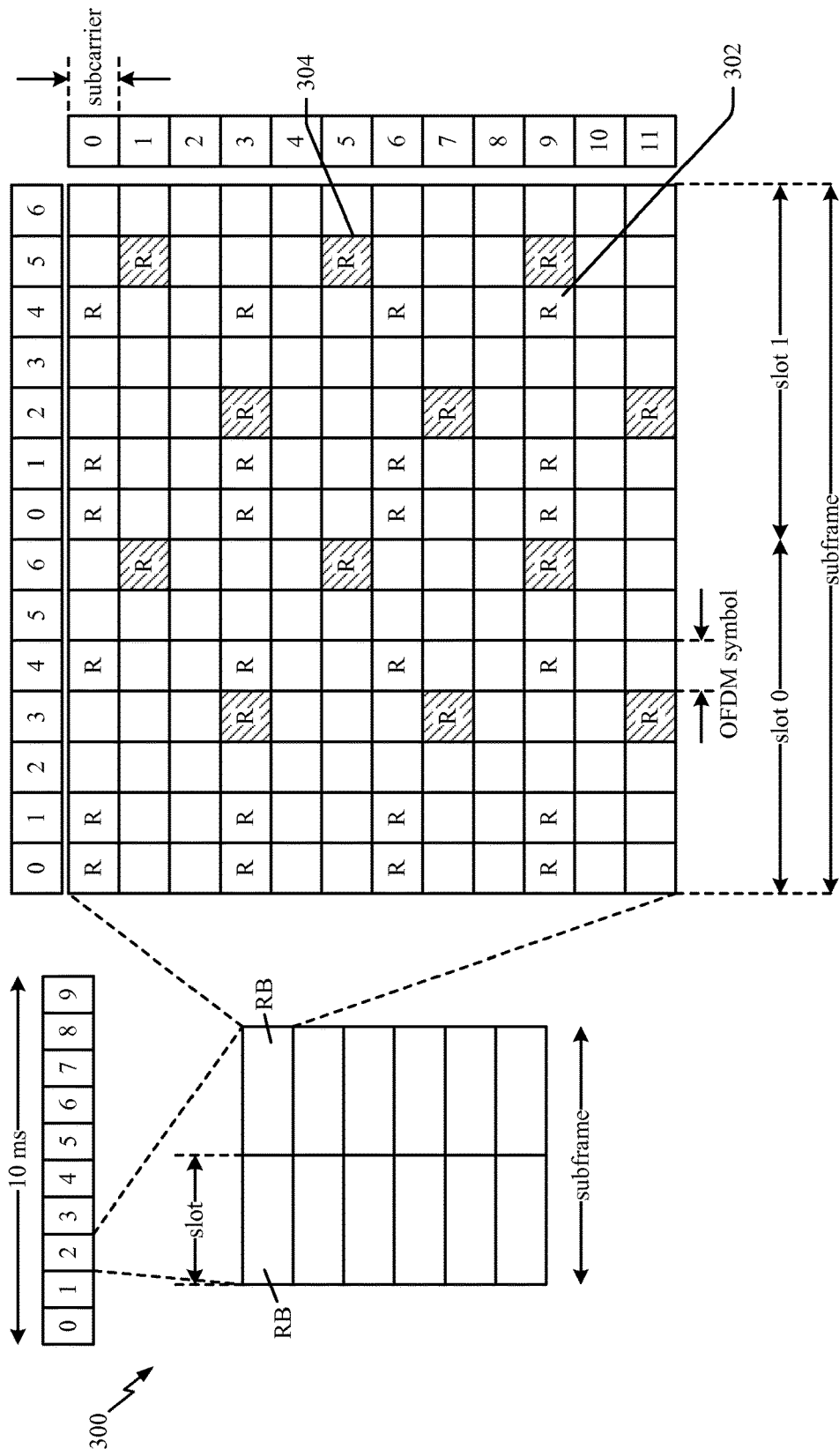
FIG. 3 is a diagram illustrating an example of a DL frame structure in LTE.

FIG. 3 is a diagram illustrating an example of a DL frame structure 300 in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include cell-specific reference signals (CRS, sometimes called common reference signals) 302 and UE-specific reference signals (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The downlink physical channels may include at least one of a physical broadcast channel (PBCH), a physical downlink control channel (PDCCH), a physical HARQ indicator channel (PHICH), and a physical downlink shared channel (PDSCH). A control format indicator (CFI) carried in a physical control format indicator channel (PCFICH) may indicate the number of symbols in the PDCCH for a particular downlink subframe. The uplink physical channels may include at least one of a physical uplink control channel (PUCCH) and a physical uplink shared channel (PUSCH). The PDCCH may carry downlink control information (DCI), which may indicate data transmissions for UEs on the PDSCH as well as provide UL resource grants to UEs for the PUSCH. The UE may transmit control information in the PUCCH on the assigned resource blocks in the control section. The UE may transmit only data or both data and control information in the PUSCH on the assigned resource blocks in the data section.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic retransmission request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
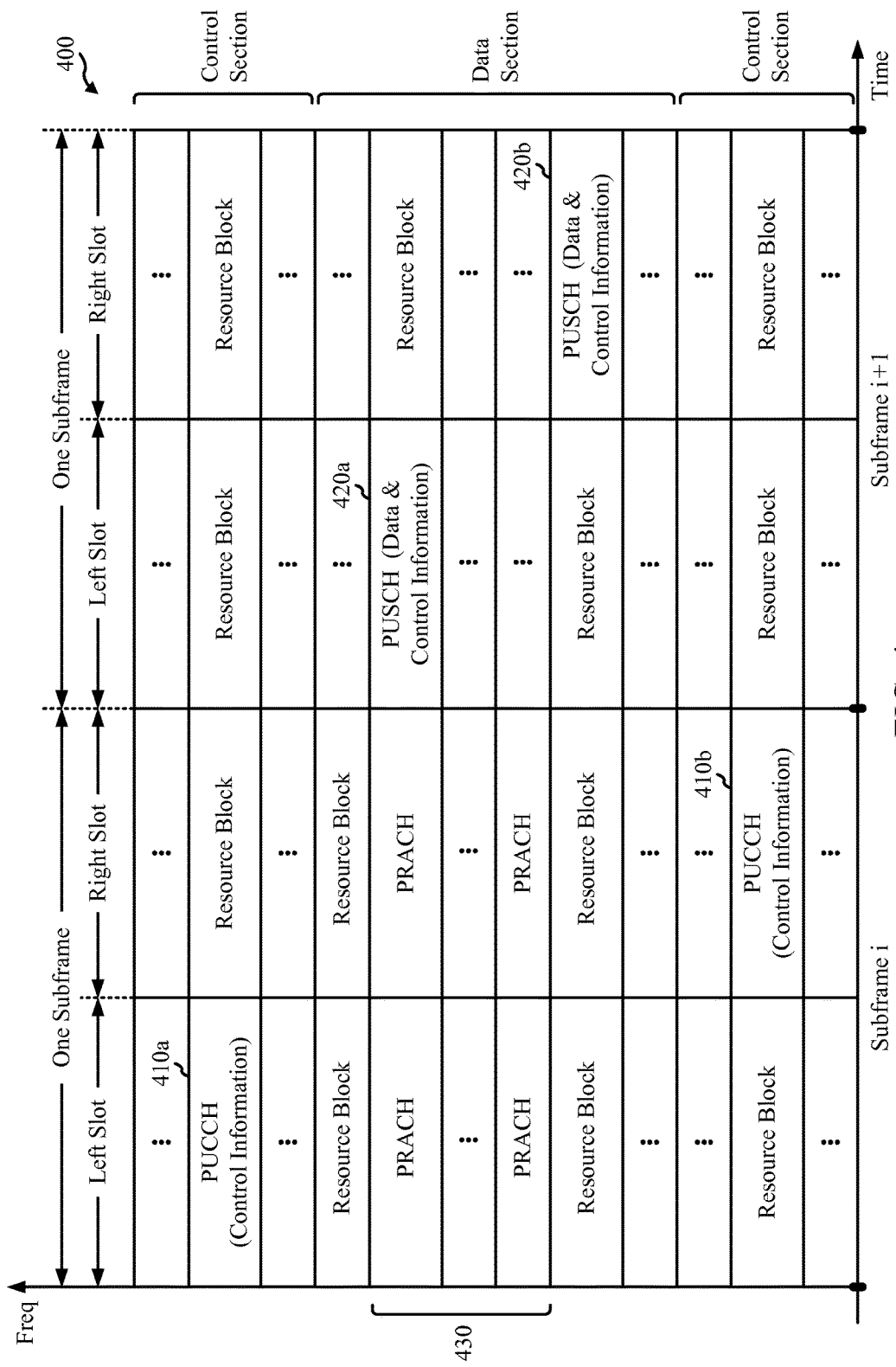
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
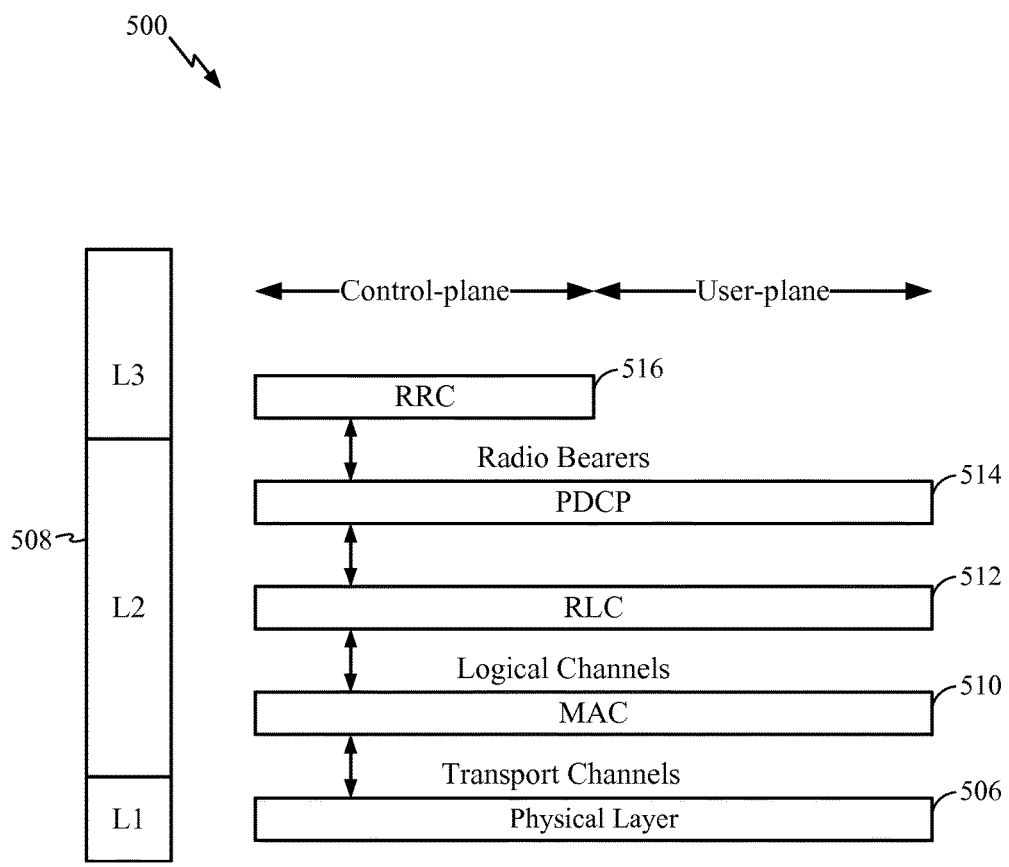
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic retransmission request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
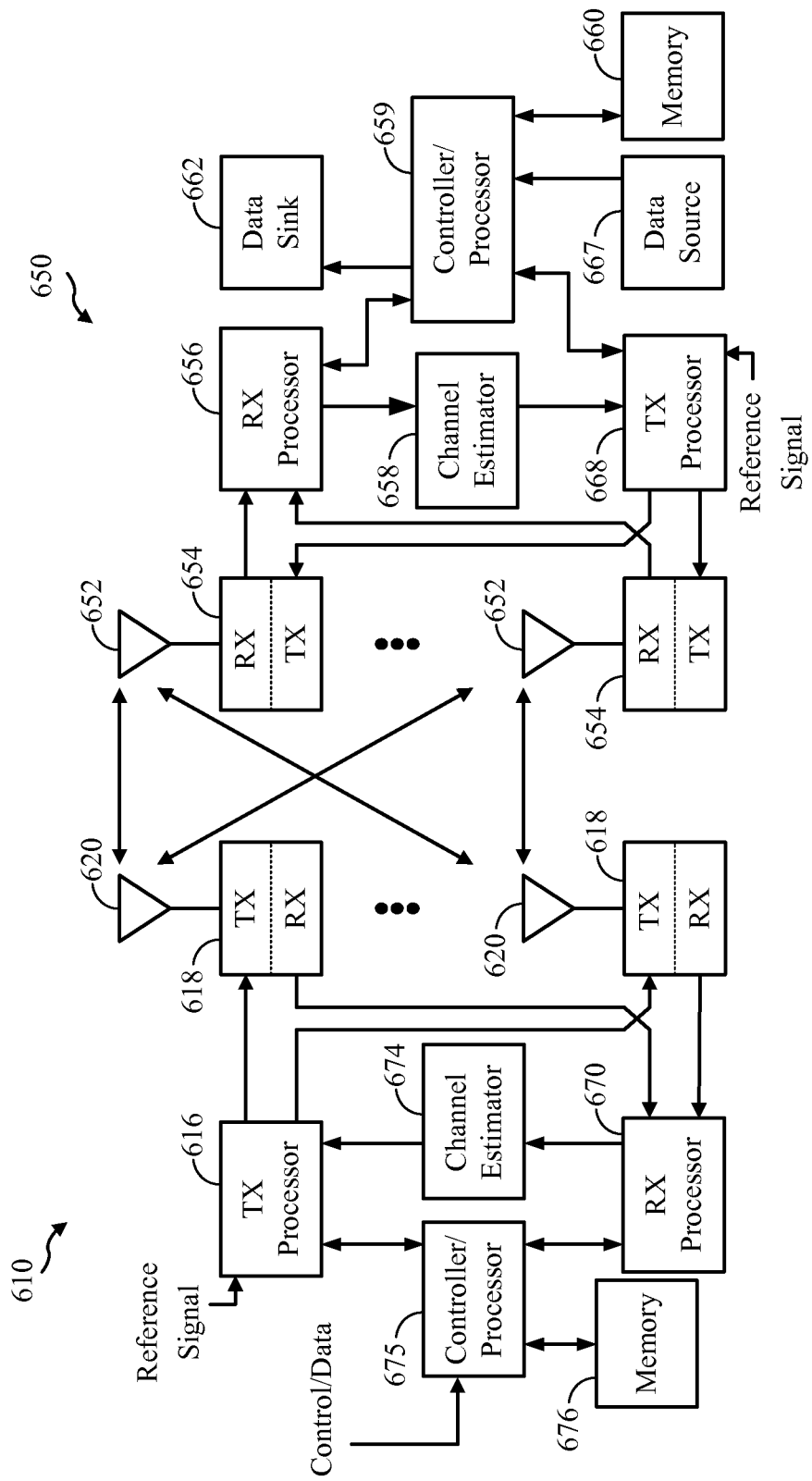
FIG. 6 is a diagram illustrating an example of an evolved Node B and user equipment in an access network, in accordance with certain aspects of the present disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. Controllers/processors 675 and 659 may direct the operation at base station 610 and UE 650, respectively. In aspects, processor 659 and/or other processors and modules at UE 650 may perform or direct operations 1000 of FIG. 10, and/or other processes for the techniques described herein. In aspects, processor 675 and/or other processors and modules at base station 610 may perform or direct operations 900 of FIG. 9, and/or other processes for the techniques described herein. However, any component or processor in FIG. 6 may perform the processes for the techniques described herein.

Employing Neighboring Cell Assistance
Information for Interference Mitigation

In embodiments, the different aspects of system 200 such as the small cells 208 and UEs 206 may be configured for network assisted acquisition of neighbor cell transmissions for heterogeneous networks deploying CSG cells. To provide network assisted acquisition for neighbor cell signals, small cells 208 may transmit assistance information (e.g., interference cancellation information) used by UEs 206 in acquiring synchronization signals, system information, and/or paging information in transmissions from neighbor cells. The small cell may, for example, indicate whether the neighbor cell is synchronized with the small cell, signal whether the neighbor cell is SFN-aligned, indicate a radio frame boundary offset of the neighbor cell, indicate neighbor cell SIB information, indicate neighbor cell paging information, and/or indicate a subframe for performing interference cancellation to acquire various neighbor cell signals.

Interference mitigation (IM) by a UE of a physical downlink shared channel (PDSCH) may greatly improve link or system performance. The interference mitigation techniques may include interference cancellation (IC) (e.g., network assisted interference cancellation), interference suppression (IS), interference avoidance, explicitly modeling the interference signal for joint detection of intended and interfering signals, or any other means of processing the interference to reduce its impact. One of the challenges for PDSCH IM is that the UE may not be aware of the scheduling information of the neighboring cells. In some situations, assistance information provided to a UE may comprise neighboring cells' scheduling information provided to a UE to aid the UE's PDSCH IM.

Figure 7:
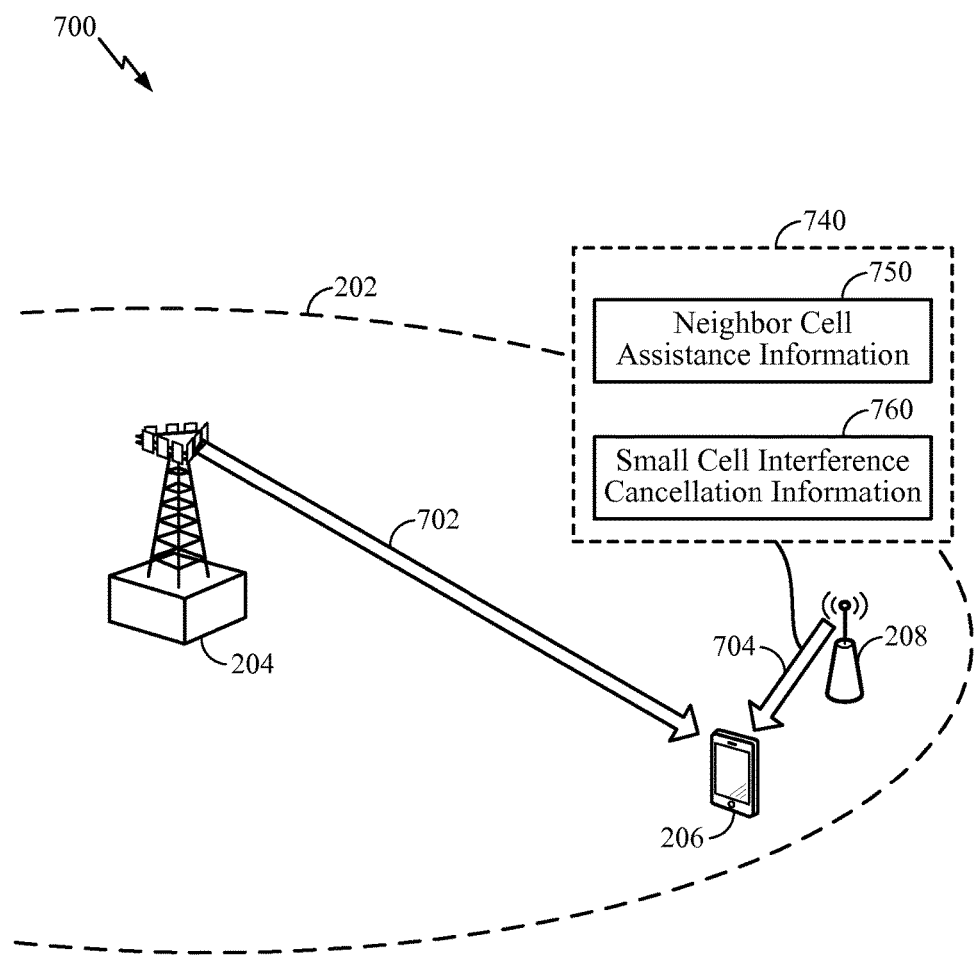
FIG. 7 is diagram of a wireless communications system for network assisted acquisition of neighbor cell signals in accordance with aspects of the present disclosure.

FIG. 7 is diagram of a wireless communications system 700 for network assisted acquisition of neighbor cell signals in accordance with various embodiments. System 700 may illustrate, for example, aspects of system 200 illustrated in FIG. 2. System 700 may include eNB 204 serving a coverage area 202 and a small cell 208. The eNB 204 may be an open access cell associated with one or more service providers. The eNB 204 may transmit downlink transmissions 702 over a carrier, which may include various signals and/or channels. The small cell 208 may also transmit downlink transmissions 704 using the same or a different carrier. The small cell 208 may be a CSG cell.

In some instances, transmissions 704 from small cell 208 received at UE 206 may be relatively strong (e.g., enough to cause inter-cell interference to transmissions 702) or even stronger (e.g., higher signal to interference plus noise ratio (SINR), etc.) than transmissions 702. For example, UE 206 may be located close to small cell 208 and near the cell edge of the coverage area 202 of eNB 204. In some cases, UE 206 may be able to receive and decode transmissions 704 but may have difficulty even finding signals within transmissions 702 used to synchronize and decode transmissions 702. For example, UE 206 may have difficulty detecting synchronization signals (e.g., primary synchronization signal (PSS), secondary synchronization signal (SSS), etc.) or channels carrying system information (e.g., PBCH, etc.) for transmissions 702 because of the interference of transmissions 704.

In some embodiments, cells 206 and/or small cells 208 may transmit assistance information (e.g., interference cancellation information) used by UEs in suppressing or cancelling the small cell signals to detect and/or decode the neighbor cell signals. The cells may, for example, transmit information that indicates transmission power level of the small cell signals (e.g., transmission power ratio, etc.), information that indicates how small cell signals are encoded or scrambled (e.g., small cell virtual ID, etc.), information relating to how small cell transmissions are allocated (e.g., CFI, etc.), or information relating to how small cell transmissions are transmitted (e.g., starting PDSCH symbol position). In some embodiments, small cells may operate according to a fixed set of parameters that can be used by UEs to suppress or cancel small cell signals. For example, small cells may operate according to a fixed set of TPR values, a fixed set of virtual IDs, fixed CFI, etc. In some embodiments, the virtual cell ID for small cells may follow a predetermined relationship with the physical cell ID of the small cell. The assistance information may be transmitted in system information messages that can be received by the UEs prior to registration on the network or establishing an RRC connection.

Figure 8:
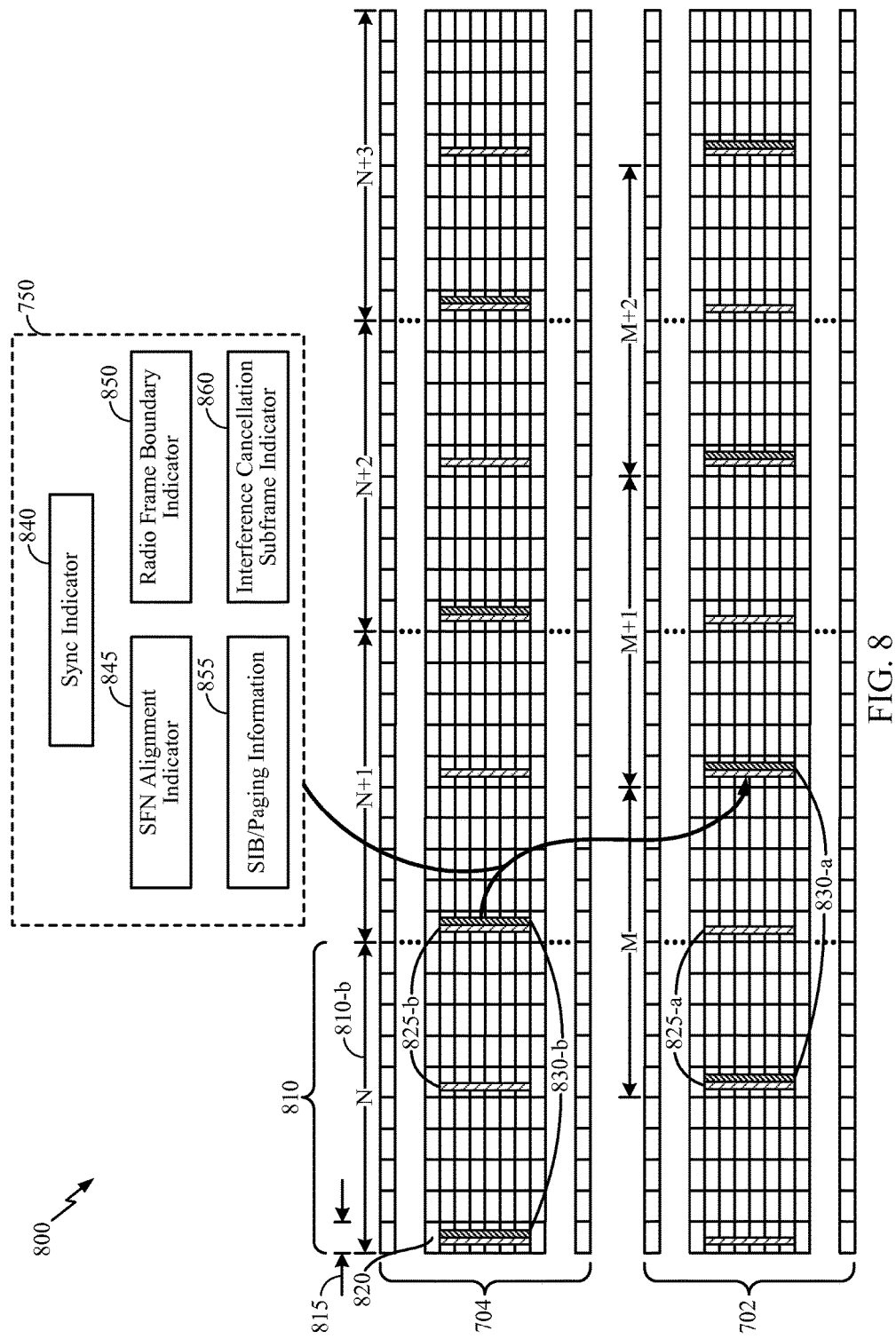
FIG. 8 is a timing diagram that illustrates network assisted acquisition of neighbor cell signals in accordance with aspects of the present disclosure.

FIG. 8 is a timing diagram 800 that illustrates network assisted acquisition of neighbor cell signals in accordance with various aspects of the present disclosure. Timing diagram 800 may illustrate, for example, network assisted acquisition of neighbor cell signals in system 700 illustrated in FIG. 7. Timing diagram 800 illustrates downlink transmission 704 of small cell 208 and downlink transmission 702 of open access cell 204. Downlink transmissions 702 and 704 may be transmitted according to an LTE/LTE-A frame structure. While timing diagram 800 illustrates FDD frame types, network assisted neighbor cell acquisition may also be applied to TDD frame types. Encoding of data and control information on transmissions 702 and 704 may be organized within frames 810, where each frame 810 may include 10 subframes 815. Frequency resources may be organized by groups of subcarriers and a resource block 820 may include twelve subcarriers for one 1 ms subframe.

As discussed above, UE 206 may be located in a position where downlink transmissions 702 and 704 may be received at the UE 206 with relatively similar received power, or transmission 704 may be received with higher SINR than transmission 702. For example, UE 206 may be located substantially closer to small cell 208 than eNB 204. UE 206 may perform a cell search procedure to determine a serving cell for transmissions. UE 206 may detect transmission 704 and detect synchronization signals 825-*b* (e.g., PSS, SSS, etc.) of transmission 704. After detecting synchronization signals 825-*b*, UE 206 may receive broadcast control messages 830-*b* (e.g., PBCH, etc.). Broadcast control messages 830-*b* may include information related to the cell identity of small cell 208. For example, broadcast control messages 830-*b* may include an indication that the small cell 208 is a CSG cell and include the CSG ID of the CSG cell. UE 206 may determine that it is not a member of the CSG cell 208 (e.g., by checking its CSG cell whitelist, etc.).

Where UE 206 is not a member of CSG cell 208, UE 206 is not able to register on CSG cell 208. However, where transmission 704 is relatively strong when received at UE 206 (e.g., enough to cause inter-cell interference to transmission 702), UE 206 may have difficulty detecting or decoding transmission 702 from eNB 204. While LTE/LTE-A may networks employ inter-cell interference cancellation (ICIC) techniques (e.g., almost blank subframes, beamforming, fractional power control, etc.), these techniques may depend on an established RRC connection between the UE 206 and the network prior to use. Because UE 206 is not authorized to register on CSG cell 208, it is not able to establish an RRC connection with the network to use these techniques to perform initial cell acquisition to eNB 204.

While CSG cell 208 and eNB 204 are illustrated as asynchronous (e.g., non-aligned radio frame boundaries), in some instances CSG cell 208 and eNB 204 may be synchronous (e.g., aligned radio frame boundaries). Where CSG cell 208 and eNB 204 are synchronous, the radio frames may have aligned system frame numbers (SFNs) or use different SFN numbering.

In some embodiments, CSG cell 208 may transmit assistance information 750 for assisting UE 206 in acquiring eNB 204. In one example, CSG cell 208 transmits assistance information 750 in system broadcast messages 830-*b* (e.g., SIB, etc.). Assistance information may include information that can be used by UE 206 to find synchronization signals 825-*a*, system broadcast channels 830-*a*, and/or paging channels (not shown) of transmission 702. Assistance information 750 may include synchronization indicator 840, SFN alignment indicator 845, radio frame boundary indicator 850, SIB/paging information 855, and/or interference cancellation subframe indicator 860.

Synchronization indicator 840, SFN alignment indicator 845, and/or radio frame boundary indicator 850 may be transmitted by CSG cell 208 to provide information about frame timing of transmission 702 relative to frame timing of transmission 704. For example, synchronization indicator 840 may indicate that transmission 702 is synchronized with transmission 704. SFN alignment indicator 845 may indicate whether transmission 702 is SFN aligned with transmission 704, while radio frame boundary indicator may indicate a relative offset of radio frames in transmission 704 from transmission 702. For example, the offset of transmission 702 from transmission 704 may be five subframes. Using this information, UE 206 may determine where (e.g., subframe location, etc.) to find synchronization signals 825-*a* and/or system broadcast channels 830-*a*. Knowing where to look for these signals reduces the amount of time and/or power used to find and decode these signals (e.g., using interference cancellation techniques, etc.). For example, instead of applying interference cancellation to each subframe to search for control information, UE 206 may determine a subframe of transmission 702 that has control information based on the assistance information and the subframe timing of transmission 704.

Additionally or alternatively, CSG cell 208 may transmit SIB/paging information 855. SIB/paging information 855 may include, for example, one or more fields from SIB1 or SIB2 blocks. For example, SIB/paging information may include the paging cycle and/or number of paging subframes for eNB 204. This information may be used by UE 206 in locating and/or decoding system broadcast information and/or paging from eNB 204. In one embodiment, CSG cell 208 may transmit SIB information for eNB 204 that enables UE 206, based on having synchronized to transmission 704, to receive paging from eNB 204 and/or perform a RACH procedure for accessing eNB 204 without separately performing synchronization and SIB acquisition for eNB 204.

In some embodiments, CSG cell 208 may transmit interference cancellation subframe indicator 860. Interference cancellation subframe indicator 860 may indicate a particular subframe (e.g., relative to the start of radio frames 810-*b*) for applying interference cancellation (e.g., successive interference cancellation (SIC), etc.). to transmission 704, which corresponds to a subframe in which the UE 206 may acquire control signals (e.g., synchronization signals 825-*a*, system broadcast messages 830-*a*, etc.) from transmission 702. For example, interference cancellation subframe indicator 860 may indicate the subframe of transmission 702 including synchronization signals 825-*a* and/or system broadcast messages 830-*a*. By reducing the number of subframes for which to apply interference cancellation, interference cancellation subframe indicator 860 may reduce the time and/or power for successfully decoding signals or channels of transmission 702.

Figure 9:
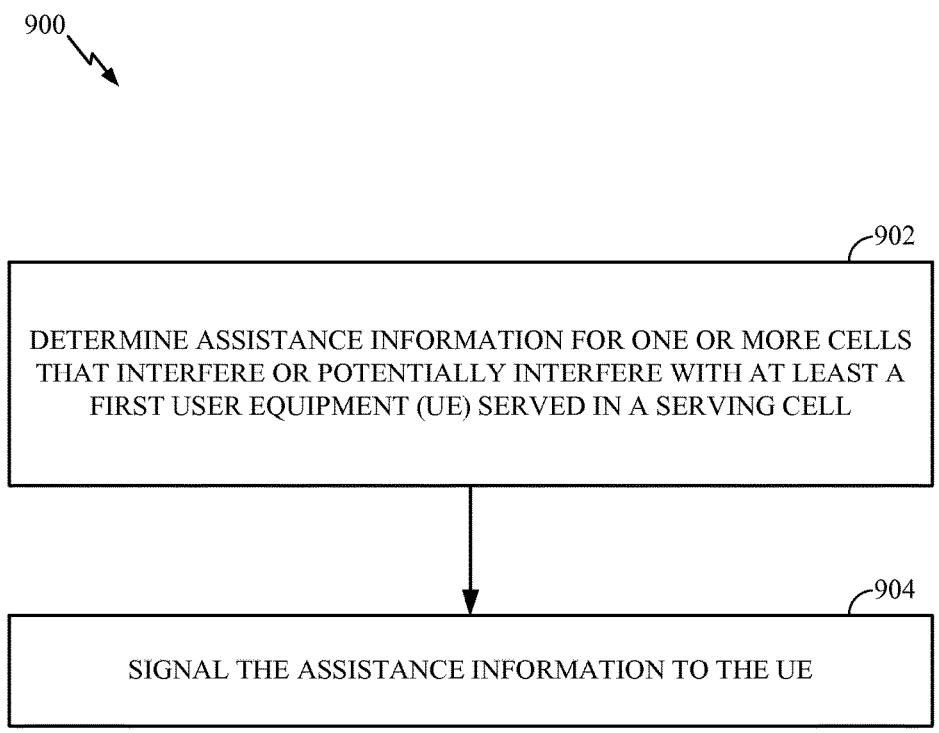
FIG. 9 shows a flow diagram illustrating operations 900 performed by a base station (BS) for conveying assistance information to a UE, in accordance with certain aspects of the present disclosure.

FIG. 9 illustrates example operations 900 that may be performed by a base station (BS) to determine assistance information for one or more neighboring cells and convey it to a user equipment (UE), in accordance with certain aspects of the present disclosure.

Operations 900 may begin, at 902 by determining assistance information for one or more cells that interfere or potentially interfere with at least a first user equipment (UE) served in a serving cell. The assistance information may comprise scheduling information regarding reference signals and the transmission resources (e.g., resource elements) used for transmitting those reference signals, for example. The base station may determine the assistance information by determining that the base station's own transmissions potentially interfere with the UE or by receiving the assistance information from the neighboring cell via a backhaul link, for example. At 904, the assistance information is signaled to the UE.

Figure 10:
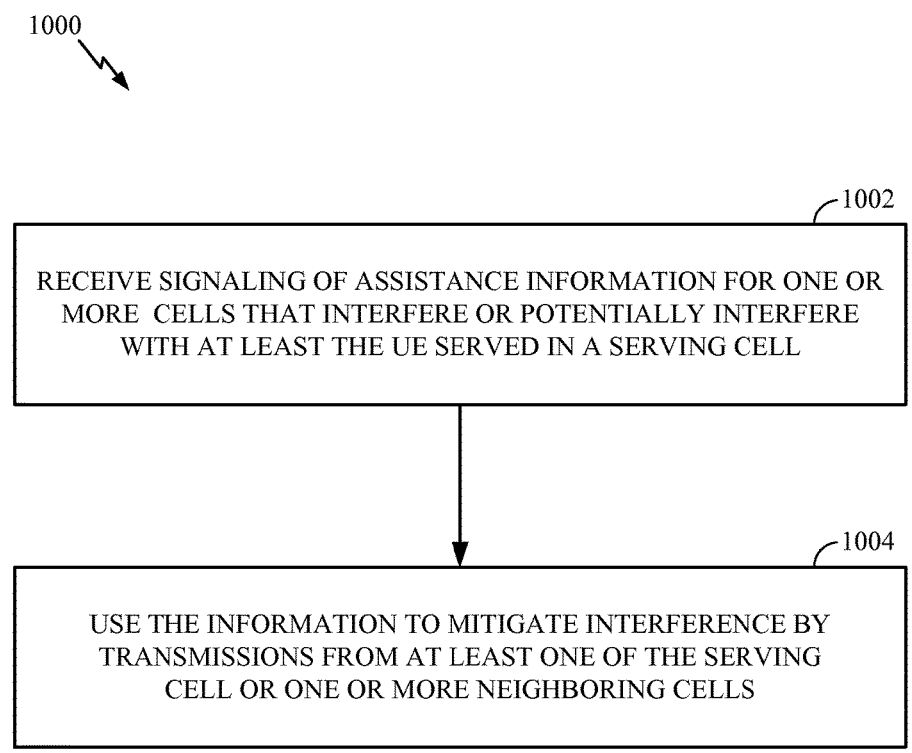
FIG. 10 shows a flow diagram illustrating operations 1000 performed by a user equipment (UE) for receiving assistance information and using it for interference cancellation, in accordance with certain aspects of the present disclosure.

FIG. 10 illustrates operations 1000 performed by a UE to receive one or more neighboring cell's assistance information and use the assistance information to mitigate interference (e.g., use the assistance information to acquire signals or perform interference cancellation) from at least one of the serving cell or one or more neighboring cells, in accordance with certain aspects of the present disclosure. The operations 1000 may be considered as UE-side operations that are complementary to BS-side operations 900.

Operations 1000 may begin, at 1002 by receiving assistance information (e.g., signaling thereof) for one or more neighboring cells that interfere or potentially interfere with the UE. At 1004, the UE uses the assistance information to mitigate interference from at least one of the serving cell or one or more neighboring cells.

The UE may mitigate interference by canceling, suppressing, avoiding, explicitly modeling, and/or otherwise processing the interference to reduce its impact. The UE may mitigate some interference by canceling the interference from a received signal, while avoiding other interference by transmitting on transmission resources (e.g., resource blocks) in which there is less interference, for example.

The assistance information may be conveyed by a serving cell or a non-serving (e.g., an interfering or potentially interfering) cell. For example, a UE may receive assistance information regarding a first neighboring cell from the UE's serving cell, while receiving assistance information regarding a second neighboring cell directly from the second neighboring cell.

According to certain aspects, the assistance information may comprise scheduling information regarding transmissions by a neighboring cell.

In some aspects, the neighboring cell scheduling information includes scheduling information for a neighboring cell's control/data channels, including but not limited to PDSCH, PCFICH, PHICH, PDCCH, and ePDCCH. For example, the scheduling information may include the PDSCH starting symbol for a neighboring cell.

In some aspects, a special PDCCH (or ePDCCH) may be used to convey a neighboring cell's scheduling information to a UE. For example, a BS may transmit a PDCCH or ePDCCH which conveys only a neighboring cell's scheduling information without the UL or DL grants a non-special PDCCH or ePDCCH conveys.

In some aspects, a new (e.g., not described in a specification released before this disclosure) downlink control information (DCI) format may be used in a special PDCCH (or ePDCCH) to convey scheduling information for a neighboring cell to a UE. The DCI format may indicate that the PDCCH (or ePDCCH) conveys scheduling information for a neighboring cell.

In some aspects, one or more reserved radio network temporary identifier (RNTI) values may be used or repurposed for conveying scheduling information for one or more neighboring cells to a UE in a special PDCCH (or ePDCCH). In some aspects, some RNTI values may be reserved for this purpose. Use of a reserved RNTI with scheduling information may indicate to the UE that the scheduling information is for a neighboring cell.

In certain aspects, information associating each reserved RNTI with a neighboring cell's identity (e.g., PCI, virtual cell ID, or equivalent identifier of a particular neighboring cell) may be conveyed to a UE. For example, first and second reserved RNTIs may be associated with first and second neighboring cells, respectively. Each neighboring cell could broadcast scheduling information for itself using the associated reserved RNTI, and UEs receiving the broadcasts can associate the scheduling information with the appropriate neighboring cells.

In some aspects, both a new DCI format and a reserved RNTI may be used in a special PDCCH (or ePDCCH) to convey scheduling information for a neighboring cell to a UE.

In some aspects, a BS may signal to a UE the association of reserved RNTI to one or more neighboring cells' identities via RRC signaling. For example, a serving BS may signal the association of reserved RNTI to one or more neighbor cells' identities to one or more served UEs via RRC signaling.

In certain aspects, a BS may transmit multiple PDCCHs (or ePDCCHs) to convey multiple sets of scheduling information.

In some aspects, a PDCCH conveying scheduling information for one or more neighboring cells may be transmitted by a UE's serving cell. The serving cell may broadcast the PDCCH conveying the one or more neighboring cells' scheduling information, or it may transmit the PDCCH conveying one or more neighboring cells' scheduling information to UEs by dedicated (e.g. unicast) signaling. For example, a serving cell may broadcast a PDCCH conveying a first neighboring cell's scheduling information, while transmitting a second neighboring cell's scheduling information to a particular UE via dedicated signaling.

In some aspects, a PDCCH conveying one or more neighboring cells' scheduling information may be transmitted by a non-serving cell. For example, a non-serving cell may broadcast its scheduling information on PDCCH, and UEs near the non-serving cell can receive the PDCCH and use the scheduling information to mitigate interference from the non-serving cell. This has the advantage that UEs which are able to receive scheduling information from a non-serving cell are at risk of experiencing interference from that non-serving cell, and therefore UEs which are not at risk of experiencing interference from that non-serving cell are not required to receive and decode scheduling information for that non-serving cell.

In some aspects, a serving cell may use a special PDCCH (or ePDCCH) to schedule a PDSCH to a UE, where the PDSCH conveys a neighboring cell's scheduling information. For example, a serving cell may transmit a PDCCH scheduling a PDSCH to a UE that may receive interference from a neighboring cell, and transmit scheduling information for the neighboring cell in the PDSCH.

In some aspects, a new DCI format may be used in a special PDCCH (or ePDCCH) to schedule a PDSCH for conveying a neighboring cell's or cells' scheduling information to a UE. For example, a serving cell may transmit a special PDCCH using a new DCI format to schedule a PDSCH to a UE that may receive interference from a neighboring cell, and transmit scheduling information for the neighboring cell in the PDSCH. A UE receiving the PDCCH with the new DCI format would interpret the scheduled PDSCH as conveying scheduling information a neighboring cell.

In some aspects, some RNTI values may be reserved for use in a special PDCCH (or ePDCCH) to schedule a PDSCH for conveying a neighboring cell's scheduling information to a UE. Use of a reserved RNTI with scheduling information may indicate to the UE that the scheduling information is for a neighboring cell. Each reserved RNTI may be associated with a neighboring cell's identity (e.g., PCI, virtual cell ID, or equivalent identifier of a particular neighboring cell), in which case a PDSCH may convey only one neighboring cell's scheduling information when a reserved RNTI value is being used.

In some aspects, a UE may be signaled the association of reserved RNTIs to neighboring cell identities to be used in PDSCH. For example, a UE may receive RRC signaling conveying the association of reserved RNTIs to neighboring cell identities.

In some aspects, both a new DCI format and a reserved RNTI may be used in a special PDCCH (or ePDCCH) scheduling a PDSCH conveying scheduling information for a neighboring cell to a UE.

In some aspects, the PDSCH that conveys a neighboring cell's scheduling information to a UE is broadcast. For example, a neighboring cell may broadcast scheduling information, so that any UE potentially interfered with by that neighboring cell can receive the scheduling information.

In some aspects, a PDCCH (ePDCCH) schedules a PDSCH conveying a neighboring cell's scheduling information, and the PDSCH may be transmitted to a UE by a serving cell.

In some aspects, the PDCCH (ePDCCH) schedules a PDSCH conveying a neighboring cell's scheduling information, and the PDSCH may be transmitted by a neighboring cell.

In some aspects, multiple PDCCHs (ePDCCHs) may schedule multiple PDSCHs conveying multiple neighboring cells' scheduling information, and the multiple PDSCHs may be transmitted to the UE. For example, a serving cell may transmit a first PDCCH scheduling a first PDSCH conveying a first neighboring cell's scheduling information, and a second PDCCH scheduling a second PDSCH conveying a second neighboring cell's scheduling information.

In some aspects, one PDSCH may include one or multiple neighboring cells' scheduling information. For example, a serving cell may transmit a PDSCH to a UE conveying scheduling information for neighboring cells A and B, and later transmit a PDSCH to a UE conveying only scheduling information for neighboring cell A.

In some aspects, one PDSCH may include scheduling info of multiple UEs served in the neighboring cells. For example, a BS may transmit a PDSCH conveying scheduling information for all UEs in a particular sector of a neighboring cell.

According to certain aspects, one PDSCH may include one or multiple neighboring cells' scheduling information. For certain aspects, the multiple sets of scheduling information may correspond to scheduling information of multiple UEs in a single cell. For other aspects, the multiple sets of scheduling information may correspond to scheduling information of multiple UEs in multiple cells. For certain aspects, the multiple sets of scheduling information may be intended for multiple UEs in the serving cell or for multiple transmission instances.

In some aspects, scheduling information for a neighboring cell may be conveyed every instance (e.g., every subframe) and valid only for the instance in which it is conveyed. For example, scheduling information for a neighboring cell may be sent in every subframe, and a UE may use the scheduling information for interference cancellation in subframes in which the UE receives a transmission.

In some aspects, scheduling information for a neighboring cell may be valid (e.g., sticky) for a specified period of time. For example, scheduling information for a neighboring cell may be valid for 2 frames (e.g., 20 ms), and a UE receiving the scheduling information may use it for IM for 2 frames, and then stop using the scheduling information for IM.

In some aspects, scheduling information for a neighboring cell may be valid until explicitly released (e.g., similar to semi-persistent scheduling). For example, scheduling information for a first neighboring cell may be valid until the first neighboring cell transmits an indication that the information is invalid. In the example, scheduling information for a second neighboring cell may be valid for 2 frames.

In some aspects, scheduling information for a neighboring cell may be valid until updated by the next scheduling information. This has the advantage of saving bandwidth versus other aspects. Treating the scheduling information as valid until updated is most useful when the neighboring cell uses semi-persistent scheduling, or when the neighboring cell's scheduling parameters do not change for a period of time.

In some aspects, portions of a neighboring cell's scheduling information conveyed to a UE may be valid only for the instance, while some other portions of the scheduling information may remain sticky. The portions may be identified as sticky or non-sticky either implicitly or by an explicit sticky/non-sticky tag in each field. For example, scheduling information transmitted in a PDSCH may be implicitly sticky, while scheduling information transmitted in a PDCCH may be implicitly valid only for the subframe of that PDCCH.

FIG. 11 illustrates multiple sets of pre-defined scheduling information. A set may be identified by an index 1102, and may comprise RB allocations 1104, one or more spatial schemes 1106, and one or more modulation and coding schemed (MCS) 1108. A BS may transmit and a UE may receive an indication that a neighboring cell is scheduling transmissions per one of the multiple sets of pre-defined scheduling information. A non-serving cell may transmit an indication that the non-serving cell is scheduling transmissions per one of the sets of pre-defined scheduling information. A serving cell may transmit an indication that one or more serving cells are scheduling transmissions per one or more of the sets of pre-defined scheduling information. The multiple sets of pre-defined scheduling information may be signaled to a UE in advance (e.g., semi-statically via RRC). An index to a set may be conveyed to a UE at each instance (e.g., subframe) to indicate scheduling information used by a non-serving cell during the instance.

The scheduling information for non-serving cells may include (but is not limited to) at least one of RB allocation, resource allocation type, rank indicator (RI), precoding matrix indicator (PMI), transmission scheme, modulation and coding scheme (MCS), modulation order, HARQ index, redundancy version (RV), new data indicator (NDI), power level, reference signal (RS)-type, transmission type (EPDCCH or PDSCH), demodulation reference signal (DM-RS) scrambling, starting symbol index, cell identity, virtual cell ID, or rate matching information. The scheduling information conveyed to a UE at 704 may only include partial or a subset of information. For example, it may include only the indication of the presence/absence of neighboring cell's PDSCH transmission for each PRB.

In some aspects, a neighboring cell's scheduling information conveyed to a UE includes semi-static transmission characteristics of the neighboring cell. The semi-static transmission characteristics may represent certain restrictions used by the scheduler of the neighboring cell. For example, the scheduler may use transmit power ratio (TPR) values chosen only among a finite set of values. Such semi-static transmission characteristics may include (but are not limited to) a set of TPR values used, transmission scheme or modulation restrictions, resource allocation type restrictions, a set of possible DCI sizes or formats, a set of possible RNTIs, and virtual cell IDs used.

In some aspects, a neighboring cell's semi-static transmission characteristics are conveyed to a UE by a PDSCH. In some aspects, a PDSCH conveying a neighboring cell's semi-static transmission characteristics may be scheduled by a special PDCCH. For example, a BS may transmit a special PDCCH indicating that the PDCCH schedules a PDSCH conveying a neighboring small cell's semi-static transmission characteristics, and a UE receiving the PDCCH will expect to receive the semi-static transmission characteristics for use in mitigating interference from the small cell.

In some aspects, a neighboring cell's semi-static transmission characteristics may be conveyed to a UE via RRC signaling. For example, a BS may transmit semi-static transmission characteristics for a neighboring small cell to a served UE via RRC, and the UE may use the small cell's transmission characteristics for mitigating interference from the small cell until the UE receives an update to the characteristics.

In some aspects, a neighboring cell's semi-static transmission characteristics may be conveyed to a UE using an existing system information block (SIB) or a new SIB. For example, a small cell may transmit the small cell's semi-static transmission characteristics via a SIB, and UEs at risk of receiving interference from the small cell may receive the SIB and use the transmission characteristics to mitigate interference the UEs receive from the small cell.

In some aspects, a new (e.g., not described in a specification released before this disclosure) DCI format may be used in a PDCCH for conveying a neighboring cell's semi-static transmission characteristics to a UE. For example, a small cell may transmit its semi-static transmission characteristics via a PDCCH using a new DCI format, and UEs capable of interpreting the new DCI format may use the semi-static transmission characteristics to mitigate interference from the small cell, while legacy (e.g., incapable of interpreting the DCI) UEs may ignore the PDCCH.

In some aspects, some RNTI values may be reserved for use in a PDSCH for conveying a neighboring cell's semi-static transmission characteristics to a UE. Use of a reserved RNTI with semi-static transmission characteristics may indicate to the UE that the semi-static transmission characteristics are for a neighboring cell. A PDSCH may convey only one neighboring cell's scheduling information when a reserved RNTI value is being used.

In some aspects, information associating each reserved RNTI with a neighboring cell's identity (e.g., PCI, virtual cell ID, or equivalent identifier of a particular neighboring cell) may be signaled to a UE. This information may be conveyed, for example, via RRC signaling.

In some aspects, both a new DCI format and a reserved RNTI may be used in a special PDCCH (or ePDCCH) to convey semi-static transmission characteristics for a neighboring cell to a UE. For example, a small cell may transmit its semi-static transmission characteristics in a PDCCH using a reserved RNTI as an indication to any receiving UE that the PDCCH conveys semi-static transmission characteristics, while using a new DCI format to convey the semi-static transmission characteristics.

In some aspects, a PDSCH conveying a neighboring cell's semi-static transmission characteristics is broadcast. For example, a small cell may broadcast its semi-static transmission characteristics, and any UE at risk of receiving interference from the small cell can receive the broadcast and use the transmission characteristics for interference mitigation.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication by a base station (BS), comprising:
determining assistance information for one or more cells that cause or potentially cause interference with at least a user equipment (UE) served in a serving cell, wherein the assistance information comprises:
a transmission power ratio,
scheduling information for one or more downlink channels transmitted in the one or more cells, and
at least one of a synchronization indicator, a subframe alignment indicator, a radio frame boundary indicator, paging information associated with the one or more cells, an identifier associated with one or more subframes for interference suppression, or a starting physical downlink data channel symbol position; and
signaling the assistance information to the UE,
wherein the scheduling information is included in at least one of a physical downlink control channel (PDCCH) or an enhanced PDCCH (ePDCCH); and
wherein a format of the at least one of the PDCCH or ePDCCH indicates the at least one of the PDCCH or ePDCCH includes the scheduling information, wherein the format is different from another format of another PDCCH or another ePDCCH that conveys a grant of transmission resources for an uplink transmission or a downlink transmission.

2. The method of claim 1, wherein the one or more downlink channels comprise at least one of a physical downlink shared channel (PDSCH), physical control format indicator channel (PCFICH), physical HARQ indicator channel (PHICH), physical downlink control channel (PDCCH), or enhanced PDCCH (ePDCCH).

3. The method of claim 1, wherein the at least one of the PDCCH or ePDCCH is transmitted by the one or more cells that cause or potentially cause interference.

4. The method of claim 1, wherein:
the BS comprises a closed subscriber group (CSG) cell; and
the assistance information is associated with an open access cell.

5. The method of claim 1, wherein the assistance information further comprises a virtual cell identifier associated with the one or more cells.

6. The method of claim 1, wherein:
the BS comprises a closed subscriber group (CSG) cell; and
the assistance information further comprises interference cancellation information for interference cancellation of signals transmitted in the CSG cell.

7. The method of claim 6, wherein the interference cancellation information comprises at least one of a virtual cell identifier associated with the CSG cell or a starting physical downlink shared data channel (PDSCH) symbol position.

8. A base station (BS) for wireless communication, comprising:
a processor configured to:
determine assistance information for one or more cells that cause or potentially cause interference with at least a user equipment (UE) served in a serving cell, wherein the assistance information comprises:
a transmission power ratio,
scheduling information for one or more downlink channels transmitted in the one or more cells, and
at least one of a synchronization indicator, a subframe alignment indicator, a radio frame boundary indicator, paging information associated with the one or more cells, an identifier associated with one or more subframes for interference suppression, or a starting physical downlink data channel symbol position, and
signal the assistance information to the UE,
wherein the scheduling information is included in at least one of a physical downlink control channel (PDCCH) or an enhanced PDCCH (ePDCCH); and
wherein a format of the at least one of the PDCCH or ePDCCH indicates the at least one of the PDCCH or ePDCCH includes the scheduling information, wherein the format is different from another format of another PDCCH or another ePDCCH that conveys a grant of transmission resources for an uplink transmission or a downlink transmission; and
a memory coupled to the processor.

9. The BS of claim 8, wherein the one or more downlink channels comprise at least one of a physical downlink shared channel (PDSCH), physical control format indicator channel (PCFICH), physical HARQ indicator channel (PHICH), physical downlink control channel (PDCCH), or enhanced PDCCH (ePDCCH).

10. The BS of claim 8, wherein the at least one of the PDCCH or ePDCCH is transmitted by the one or more cells that cause or potentially cause interference.

11. The BS of claim 8, wherein:
the BS comprises a closed subscriber group (CSG) cell; and
the assistance information is associated with an open access cell.

12. The BS of claim 8, wherein the assistance information further comprises a virtual cell identifier associated with the one or more cells.

13. The BS of claim 8, wherein:
the BS comprises a closed subscriber group (CSG) cell; and
the assistance information further comprises interference cancellation information for interference cancellation of signals transmitted in the CSG cell.

14. The BS of claim 13, wherein the interference cancellation information comprises at least one of a virtual cell identifier associated with the CSG cell, or a starting physical downlink shared data channel (PDSCH) symbol position.

15. A non-transitory computer-readable medium for wireless communication by a base station (BS), the non-transitory computer-readable medium comprising code for:
determining assistance information for one or more cells that cause or potentially cause interference with at least a user equipment (UE) served in a serving cell, wherein the assistance information comprises:
a transmission power ratio,
scheduling information for one or more downlink channels transmitted in the one or more cells, and
at least one of a synchronization indicator, a subframe alignment indicator, a radio frame boundary indicator, paging information associated with the one or more cells, an identifier associated with one or more subframes for interference suppression, or a starting physical downlink data channel symbol position; and
signaling the assistance information to the UE,
wherein the scheduling information is included in at least one of a physical downlink control channel (PDCCH) or an enhanced PDCCH (ePDCCH); and wherein an identifier used to encode the at least one of the PDCCH or ePDCCH indicates the at least one of the PDCCH or ePDCCH includes the scheduling information.

16. The non-transitory computer-readable medium of claim 15, wherein the at least one of the PDCCH or ePDCCH is transmitted by the one or more cells that cause or potentially cause interference.

17. The non-transitory computer-readable medium of claim 15, wherein:
the BS comprises a closed subscriber group (CSG) cell; and
the assistance information is associated with an open access cell.

18. The non-transitory computer-readable medium of claim 15, wherein:
the BS comprises a closed subscriber group (CSG) cell; and
the assistance information further comprises interference cancellation information for interference cancellation of signals transmitted in the CSG cell.

19. A method for wireless communications by a user equipment (UE), comprising:
receiving, at the UE, signaling of assistance information for one or more cells that cause or potentially cause interference with at least the UE served in a serving cell, wherein the assistance information comprises:
a transmission power ratio,
scheduling information for one or more downlink channels transmitted in the one or more cells, and
at least one of a synchronization indicator, a subframe alignment indicator, a radio frame boundary indicator, paging information associated with the one or more cells, an identifier associated with one or more subframes for interference suppression, or a starting physical downlink data channel symbol position; and
using the assistance information to mitigate interference by transmissions from at least one of the serving cell or one or more cells that cause interference,
wherein the scheduling information is included in at least one of a physical downlink control channel (PDCCH) or an enhanced PDCCH (ePDCCH); and
wherein a format of the at least one of the PDCCH or ePDCCH indicates the at least one of the PDCCH or ePDCCH includes the scheduling information, wherein the format is different from another format of another PDCCH or another ePDCCH that conveys a grant of transmission resources for an uplink transmission or a downlink transmission.

20. The method of claim 19, wherein:
receiving the signaling of assistance information comprises receiving the signaling of assistance information from a non-serving closed subscriber group (CSG) cell; and
the assistance information is associated with an open access cell.

21. The method of claim 19, wherein the assistance information further comprises a virtual cell identifier associated with the one or more cells.

22. A user equipment (UE) for wireless communications, comprising:
a processor configured to:
receive signaling of assistance information for one or more cells that cause or potentially cause interference with at least the UE served in a serving cell, wherein the assistance information comprises:
a transmission power ratio,
scheduling information for one or more downlink channels transmitted in the one or more cells, and
at least one of a synchronization indicator, a subframe alignment indicator, a radio frame boundary indicator, paging information associated with the one or more cells, an identifier associated with one or more subframes for interference suppression, or a starting physical downlink data channel symbol position; and
use the assistance information to mitigate interference by transmissions from at least one of the serving cell or one or more cells that cause interference,
wherein the scheduling information is included in at least one of a physical downlink control channel (PDCCH) or an enhanced PDCCH (ePDCCH); and
an identifier used to encode the at least one of the PDCCH or ePDCCH indicates the at least one of the PDCCH or ePDCCH includes the scheduling information; and
a memory coupled to the processor.

23. The UE of claim 22, wherein:
the processor is further configured to receive the signaling of assistance information from a non-serving closed subscriber group (CSG) cell; and
the assistance information is associated with an open access cell.

24. The UE of claim 22, wherein the assistance information further comprises a virtual cell identifier associated with the one or more cells.

* * * * *